United States Patent
Lolli

(10) Patent No.: US 9,221,221 B2
(45) Date of Patent: Dec. 29, 2015

(54) KIT FOR REPAIRING AND INFLATING INFLATABLE ARTICLES, AND FEATURING A CONTROL DEVICE

(75) Inventor: Sergio Lolli, Pesaro (IT)

(73) Assignee: TEK Global S. R. L., Pesaro (IT)

( * ) Notice: Subject to any disclaimer, the term of this patent is extended or adjusted under 35 U.S.C. 154(b) by 896 days.

(21) Appl. No.: 12/260,461

(22) Filed: Oct. 29, 2008

(65) Prior Publication Data

US 2009/0139604 A1 Jun. 4, 2009

(30) Foreign Application Priority Data

Oct. 31, 2007 (IT) .............................. TO2007A0776

(51) Int. Cl.
| | |
|---|---|
| B65B 31/00 | (2006.01) |
| B65B 1/08 | (2006.01) |
| B65B 1/04 | (2006.01) |
| B65B 3/16 | (2006.01) |
| B65B 1/30 | (2006.01) |
| B29C 73/16 | (2006.01) |
| B29L 30/00 | (2006.01) |

(52) U.S. Cl.
CPC ........... *B29C 73/166* (2013.01); *B29L 2030/00* (2013.01)

(58) Field of Classification Search
CPC .... B29C 73/166; B60S 5/046; B29L 2030/00
USPC ............ 141/38, 4, 5, 67, 100, 104, 105, 114, 141/193, 197, 231, 285, 313, 351
See application file for complete search history.

(56) References Cited

U.S. PATENT DOCUMENTS

| | | | | |
|---|---|---|---|---|
| 6,176,285 | B1 * | 1/2001 | Gerresheim et al. | .......... 152/509 |
| 6,283,172 | B1 | 9/2001 | Thurner | |
| 6,904,932 | B1 * | 6/2005 | Haraughty | .................... 137/231 |
| 7,789,110 | B2 * | 9/2010 | Marini | ............................. 141/38 |
| 8,115,615 | B2 * | 2/2012 | Miller et al. | ................... 340/457 |

(Continued)

FOREIGN PATENT DOCUMENTS

| | | |
|---|---|---|
| CN | 1926018 A | 3/2007 |
| TW | 319193 | 9/2007 |

(Continued)

OTHER PUBLICATIONS

Search Report mailed on Feb. 3, 2009 from European Patent Office for corresponding European Application 08168126.4.

(Continued)

*Primary Examiner* — Len Tran
*Assistant Examiner* — Steven M Cernoch
(74) *Attorney, Agent, or Firm* — Ladas & Parry LLP

(57) ABSTRACT

A kit for repairing and inflating an inflatable article has a compressor assembly for producing compressed air; a canister assembly containing sealing fluid and connected releasably to the compressor assembly; an electric circuit for turning the compressor assembly on; a first line connecting the compressor assembly to the canister assembly; a second line connected, parallel to the first line, to the compressor assembly, and connectable to the inflatable article; a selector device connected fluidically between the compressor assembly and the first and second line; and control means user-operated to turn the compressor assembly on and off by means of the electric circuit, and integrated in the selector device.

42 Claims, 2 Drawing Sheets

(56) References Cited

U.S. PATENT DOCUMENTS

| | | | |
|---|---|---|---|
| 8,146,622 B2* | 4/2012 | Guan et al. | 141/38 |
| 8,181,676 B2* | 5/2012 | Steele et al. | 141/38 |
| 8,251,105 B2* | 8/2012 | Lolli et al. | 141/38 |
| 2001/0017134 A1* | 8/2001 | Bahr | 128/204.18 |
| 2003/0047652 A1 | 3/2003 | Eckhardt | |
| 2004/0159365 A1 | 8/2004 | Cowan et al. | |
| 2009/0301602 A1* | 12/2009 | Lolli et al. | 141/38 |

FOREIGN PATENT DOCUMENTS

| | | | | |
|---|---|---|---|---|
| WO | 2005/085028 A1 | 9/2005 | | |
| WO | WO 2005085028 A1 * | 9/2005 | | B60S 5/04 |
| WO | WO 2007/102066 A | 9/2007 | | |

OTHER PUBLICATIONS

Office Action dated Nov. 28, 2013 for Taiwanese Application No. 097141948.

Examination Report dated Jul. 5, 2015 for Taiwanese Application No. 097141948.

Translation of the abstract of TW M319193.

* cited by examiner

KIT FOR REPAIRING AND INFLATING INFLATABLE ARTICLES, AND FEATURING A CONTROL DEVICE

This application claims priority of Italian Patent Application No. TO2007A 000776 filed Oct. 31, 2007, the disclosure of which is incorporated herein by reference.

The present invention relates to a kit for repairing and inflating inflatable articles, in particular tyres, and comprising a device for activating flow of compressed air by which to repair and/or inflate the article.

BACKGROUND OF THE INVENTION

Kits are known comprising an outer casing; a compressor assembly housed in the casing; and a sealing fluid canister assembly connected releasably to the compressor assembly.

The canister assembly is connectable to a tyre by a hose.

The kit also comprises a second hose for connecting the compressor assembly to the tyre to inflate the tyre without the compressed air flowing through the canister assembly.

The compressed air from the compressor is directed to the canister assembly or to the second hose by a hand-operated knob controlling a fluid valve.

Known kits also comprise a main switch user-operated to turn the compressor assembly on and off.

Repairing a tyre therefore comprises: connecting the kit to a voltage outlet; connecting the canister assembly to the tyre; selecting repair mode; and operating the main switch.

SUMMARY OF THE INVENTION

It is an object of the present invention to provide a repair and inflation kit that is even easier to use.

According to the present invention, there is provided a kit for repairing and inflating inflatable articles, as claimed in the attached claims.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
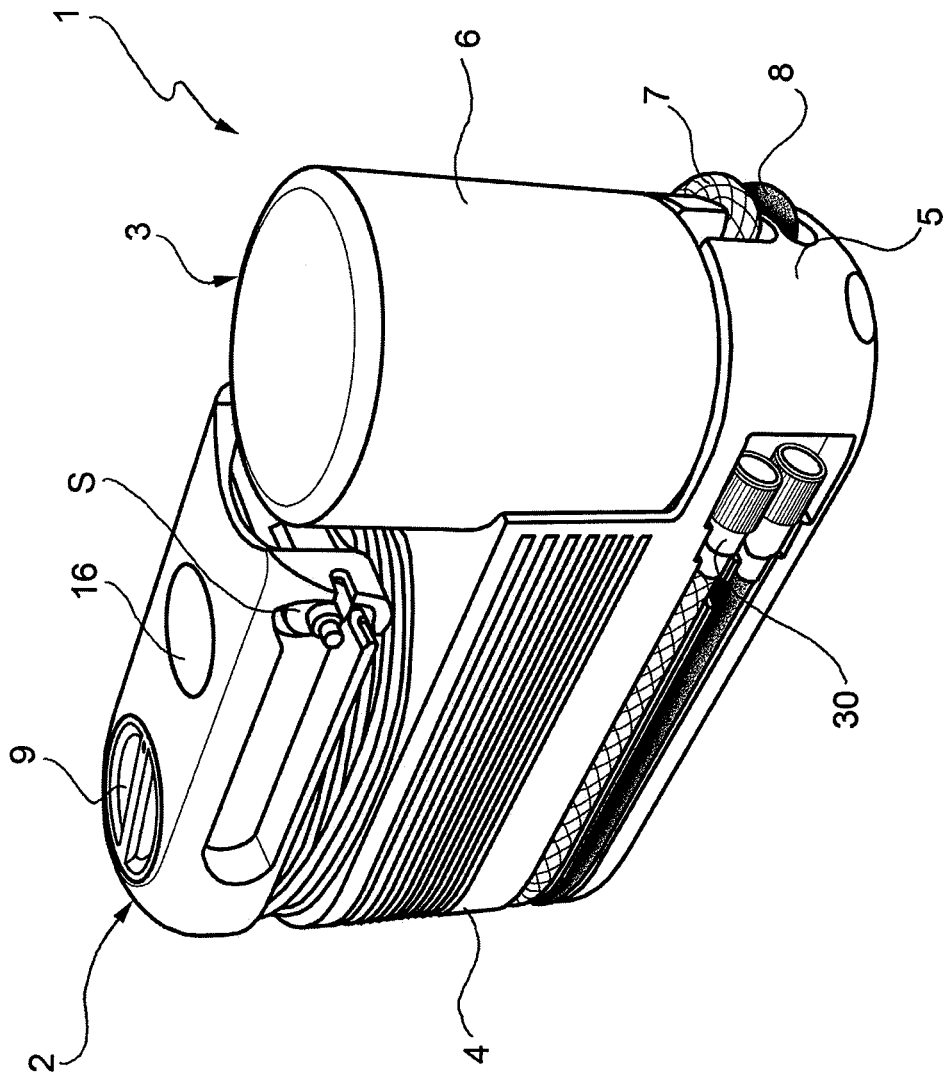
FIG. 1 shows a view in perspective of a kit in accordance with the present invention.

Number 1 in FIG. 1 indicates as a whole a kit for repairing and inflating inflatable articles, and comprising an outer casing 2; a compressor assembly C (shown schematically in FIG. 2) housed in outer casing 2; and a canister assembly 3 connected releasably to compressor assembly C.

More specifically, outer casing 2 comprises a substantially parallelepiped-shaped portion 4 housing compressor assembly C; and a projecting portion 5 projecting from the end of portion 4 to define a seat at least partly housing canister assembly 3.

Canister assembly 3 contains a sealing fluid for repairing a punctured tyre, and comprises an upside down bottle 6, and a hose 7 connected to bottle 6 to feed the sealing fluid into the tyre.

Kit 1 also comprises a second hose 8 connected directly to compressor assembly C to inflate the tyre without injecting sealing fluid; and a knob 9 for selecting a repair mode in which hose 7 and bottle 6 are connected to compressor assembly C, an inflation mode in which hose 8 is connected to compressor assembly C, and a compressor assembly C turn-off mode.

Figure 2A:
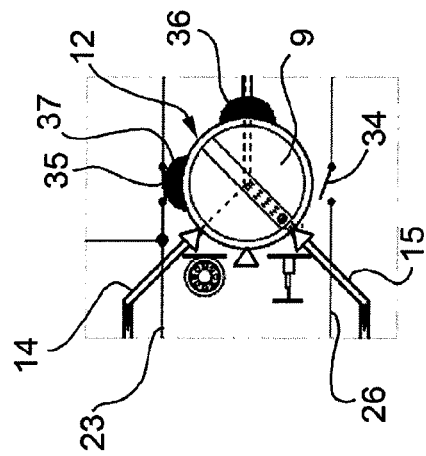
FIGS. 2a and 2b show enlargements of FIG. 2 in two different operating modes of the kit according to the present invention.
Figure 2B:
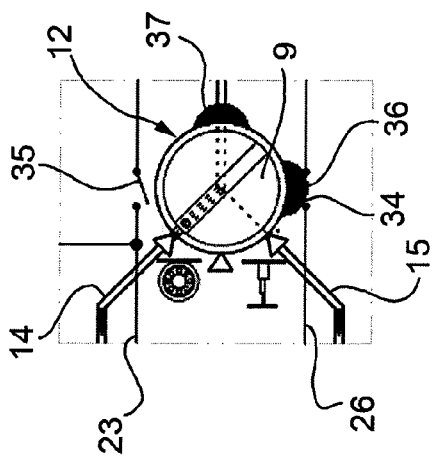
Figure 2:
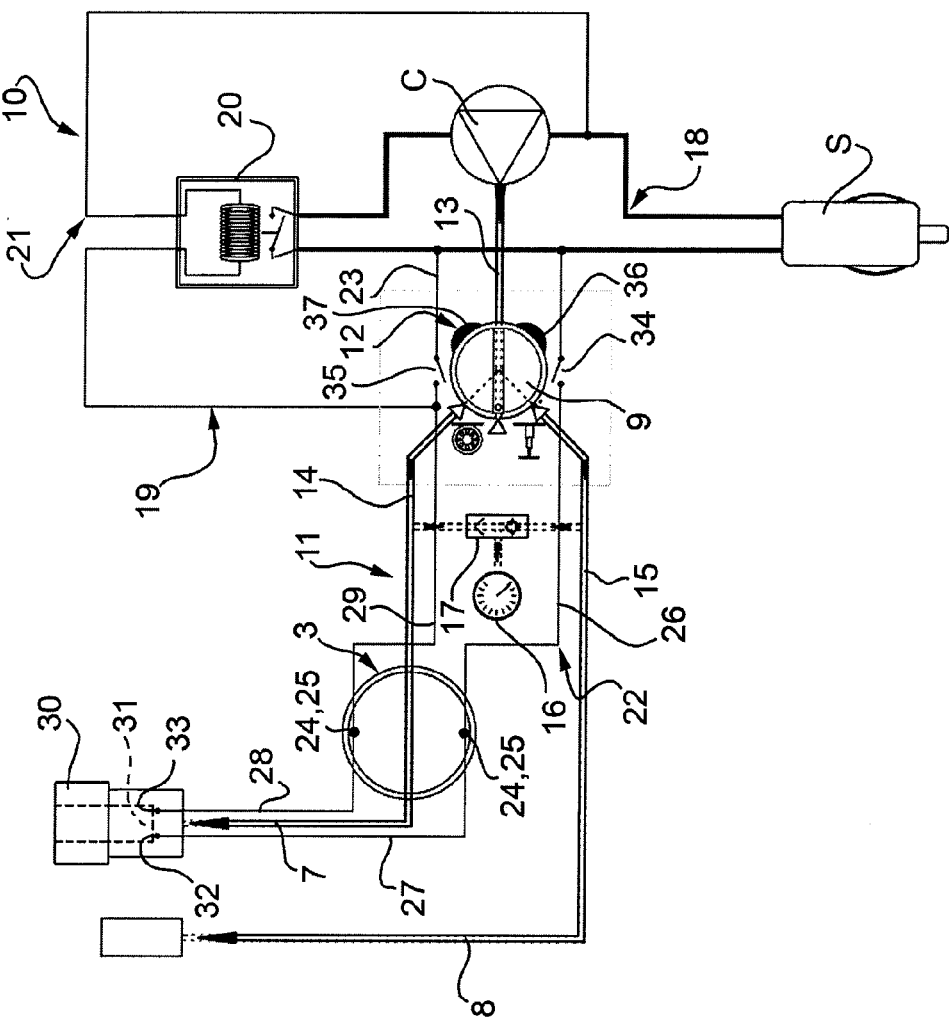
FIG. 2 shows an electric and pneumatic circuit diagram of the compressor assembly of the FIG. 1 kit.

FIG. 2 shows schematically an electric circuit 10 for activating compressor assembly C; and a pneumatic circuit 11 for feeding the compressed air produced by compressor assembly C to canister assembly 3 or hose 8. Electric circuit 10 and pneumatic circuit 11 are advantageously controlled by a selector device 12 comprising a one-inlet, two-outlet fluid valve (shown schematically), and knob 9 for manual selection.

Pneumatic circuit 11 comprises a main feed line 13 connected rigidly between compressor assembly C and selector device 12; an intermediate line 14 connecting an outlet of selector device 12 to canister assembly 3; and an intermediate line 15 connecting an outlet of selector device 12 to hose 8.

Pneumatic circuit 11 also comprises a gauge 16 connected to intermediate lines 14, 15 by a ball selecting valve 17, by which gauge 16 records the higher of the pressures in intermediate lines 14, 15.

Pneumatic circuit 11 is controlled by selector device 12 in coordination with electric circuit 10, and comprises a power branch 18 and a control branch 19.

Power branch 18 connects an electric motor of compressor assembly C, a plug S, and a normally-open relay 20, and is conveniently supplied with the current required to operate electric motor and of a higher amperage than the current flowing in control branch 19.

Control branch 19 is connected to power branch 18, and comprises an actuating line 21 for controlling relay 20; and a first and second control line 22, 23 parallel-connected between actuating line 21 and power branch 18.

Control line 22 comprises an electric sensor 31 for determining connection to the tyre and preferably fitted to canister assembly 3.

Control line 22 therefore also extends to canister assembly 3, and, for this purpose, comprises a releasable electric connection (not shown in detail), e.g. a first pair of terminals 24 on canister assembly 3, and a second pair of terminals 25 (shown superimposed over terminals 24) fixed with respect to casing 2 and designed to contact terminals 24 when canister assembly 3 is connected to compressor assembly C.

More specifically, control line 22 comprises a portion 26 for connecting one terminal 25 to power branch 18; a portion 27 and a portion 28 on canister assembly 3 and connected to respective terminals 24; and a portion 29 connecting the other terminal 25 to actuating line 21.

Portions 27 and 28 advantageously extend from terminals 24 into a ring nut connecting device 30 fitted to a free end of hose 7, and preferably extend inside hose 7. Portions 27 and 28 are connected to the terminals of sensor 31, which is designed to short-circuit portions 27, 28 when ring nut connecting device 30 is screwed correctly to the tyre safety valve.

For example, sensor 31 comprises a first terminal 32 connected to portion 27; and a second terminal 33 connected to portion 28 and isolated from terminal 32. Terminals 32, 33 are arranged inside ring nut connecting device 30 so as to be short-circuited by the tyre safety valve, and are advantageously located at the bottom of the cavity partly housing the safety valve, so as to only be short-circuited when ring nut connecting device 30 is screwed completely to the safety valve.

Sensor 31 can be disconnected from the compressor assembly, and so disabled, by selector device 12, which is designed to appropriately control lines 22, 23.

More specifically, portion 26 of control line 22 comprises a switch 34, and, similarly, control line 23 comprises a switch 35.

In a preferred embodiment, knob 9 is connected rigidly to the rotating distribution element of the one-inlet, two-outlet fluid valve; switches 34 and 35 are normally open; and selector device 12 comprises a contoured member connected rigidly to knob 9 and having a first and second projection 36, 37 cooperating with switches 34, 35 respectively, so that switches 34 and 35 are either both open or one closed and the other open.

Kit 1 as described operates as follows.

Compressor assembly C (FIG. 2) is turned off and cannot be turned on, when selector device 12 is set to turn-off mode with both switches 34, 35 open. Therefore no current flows along control branch 19, and, since relay 20 cannot be activated and compressor assembly C is disconnected from plug S, compressor assembly C cannot be turned on even if plug S is connected to a voltage source.

To inflate the tyre (FIG. 2a), knob 9 is turned to a first setting to connect main feed line 13 fluidically to hose 8, and to close switch 35 either simultaneously or with a delay.

When switch 35 closes and plug S is connected to a voltage source, low-intensity control current flows along actuating line 21 and closes relay 20, thus turning on compressor assembly C and feeding compressed air to hose 8. It is important to note that, when switch 35 is closed and switch 34 open, sensor 31 is isolated from power branch 18 and has no effect on turning on compressor assembly C.

To repair the tyre (FIG. 2b), knob 9 is turned to a second setting that automatically reopens switch 35 and closes switch 34, thus connecting sensor 31 to power branch 18 to control turn-on of compressor assembly C. At the same time, main feed line 13 is connected fluidically to canister assembly 3 by intermediate line 14.

More specifically, when switch 34 is closed and switch 35 open, current flows along control branch 19 depending on sensor 31. If sensor 31 short-circuits terminals 32, 33, current flows along control branch 19 and relay 20 closes automatically. If terminals 32, 33 are disconnected, control branch 19 is open and relay 20 remains open.

To turn off compressor assembly C, knob 9 is turned to an intermediate position, in which switches 34, 35 are both open.

The advantages of kit 1 described are as follows.

The design of electric circuit 10 and selector device 12 provides for achieving a kit in which one member provides for both turning on compressor assembly C and fluid control. As a result, kit 1 has no additional user-operated main switch, and correct operation of the kit is controlled entirely by knob 9 of selector device 12.

Kit 1 is thus highly automated and so easier to use. In fact, repairing a tyre using kit 1 simply comprises connecting the kit to a voltage source, connecting hose 7 to the tyre, and setting knob 9 to repair mode.

Moreover, dividing the electric circuit into a power branch 18 and a control branch 19 connected by relay 20 provides for protecting power branch 18 and relay 20 inside casing 2, and for employing low current for sensor 31, terminals 24, 25, and switches 34, 35.

Using sensor 31 also prevents sealing fluid splatter in the event of the user turning knob 9 before connecting hose 7 to the tyre.

Clearly, changes may be made to kit 1 as described and illustrated herein without, however, departing from the scope of the present invention as defined in the accompanying Claims.

In particular, relay 20 may be replaced by any other device performing the function of an electrically controlled switch designed to remain open when not controlled electrically.

Inside the ring nut device, terminals 32 and 33 may be arranged a fixed distance apart in the assembly direction of ring nut device 30 to the tyre safety valve, so that sensor 31 short-circuits terminals 32, 33 when the safety valve is inserted inside ring nut device 30 by a length equal to the distance between terminals 32, 33.

Alternatively, sensor 31 may comprise a movable member that is contacted by the safety valve and so short-circuits terminals 32, 33.

The invention claimed is:

1. A kit for repairing and inflating an inflatable article, the kit comprising
a chassis,
a compressor assembly for producing compressed air;
a canister assembly containing sealing fluid and connected releasably to said compressor assembly;
an electric circuit for turning on said compressor assembly;
a first line connecting said compressor assembly to said canister assembly;
a second line connected in parallel to said first line to said compressor assembly, and connectable to the inflatable article;
a selector device connected fluidically between said compressor assembly and said first and second line; and
user-operated control means to connect said compressor to either said first line or said second line
wherein said electric circuit comprises a sensor for determining a connection of to said inflatable article said sensor effecting closure of said circuit for activating the compressor, said circuit further containing connectors such that the circuit is only closed when said canister assembly is properly mounted on said chassis whereby current can flow to the compressor only when said sensor determines that a connection has been made to said inflatable article, said control means further acting to close a switch in electrical circuit such that when the compressor is connected to said first line, the compressor assembly is only turned on if said switch is closed
wherein said sensor effects closing of said circuit by direct short circuiting through a stem valve on said inflatable article.

2. A kit as claimed in claim 1, wherein said electric circuit comprises an electrically controlled switch; and a control branch connected to said electrically controlled switch and controlled by said selector device.

3. A kit as claimed in claim 2, wherein said control branch comprises an actuating line for switching said electrically controlled switch; a first electric line; and a second electric line parallel to said first electric line; said selector device being designed to selectively activate said first or said second electric line.

4. A kit as claimed in claim 3, wherein said electric circuit comprises a power branch connected to said compressor assembly (C) and to said electrically controlled switch.

5. A kit as claimed in claim 4, wherein said first electric line comprises a first electric switch, and said line comprises a first second electric line comprises a second switch; said selector device being designed to selectively activate said first and second switch.

6. A kit as claimed in claim 1, wherein said selector device is movable selectively into a first position in which said compressor assembly cannot be turned on; a second position in which said compressor assembly is connected fluidically to said first line; and a third position in which said compressor assembly is connected fluidically to said second line, and said electric circuit automatically activates said compressor assembly.

7. A kit as claimed in claim 1, wherein said selector device is movable selectively into a first position in which said compressor assembly cannot be turned on; a second position in which said compressor assembly is connected fluidically to said first line; and a third position in which said compressor assembly is connected fluidically to said second line, and said electric circuit automatically activates said compressor assembly and said electric circuit is designed so that said sensor is connected to said compressor assembly when said selector device is in said second position, and is disconnected from said compressor assembly when said selector device is in said third position.

8. A kit as claimed in claim 1, wherein said selector device is the only device for user control of said electric circuit.

9. A kit as claimed in claim 1, wherein said electric circuit comprises no manually operated switch separate from said selector device.

10. A kit for repairing and inflating an inflatable article, the kit comprising a compressor assembly for producing compressed air;
a canister assembly containing sealing fluid injectable into said inflatable article through a sealing fluid hose by means of a stream of compressed air from said compressor unit;
a fluid line designed to connect said compressor assembly to said inflatable article;
said canister assembly being connected releasably to said compressor assembly;
an electric circuit for turning on said compressor assembly;
an internal connection line connecting said compressor assembly to said canister assembly;
a selector device connected fluidically between said compressor assembly and said fluid line and internal connection line; and user-operated electrical control means to direct fluid from said compressor unit into either said fluid line or said internal connection line and to turn said compressor assembly on and off by means of said electric circuit;
wherein said electric circuit comprises a sensor for determining a connection of said sealing fluid hose to said inflatable article, which sensor effects a short circuit between terminals in said electric circuit by direct short circuiting through a stem valve on said inflatable article.

11. A kit as claimed in claim 10 wherein said terminals are designed to short circuit when said sealing fluid hose is affixed correctly to a tyre safety valve.

12. A kit as claimed in claim 10, wherein said electric circuit is designed such that when fluid is to flow through said sealing fluid hose, current flows to the compressor only if said terminals are short circuited.

13. A kit as claimed in claim 10 wherein said electric circuit further comprises an electrically controlled switch which controls the power supply to the compressor, said electrically controlled switch being itself being connected to control means integrated in said selector device.

14. A kit as claimed in claim 10 wherein said electric circuit comprises a first electric line connecting said sensor to a first electric switch forming part of said control means and a second electric line connecting said compressor assembly to a second switch also forming part of said control means, said selector device being designed to selectively activate said first and second switches so that they cannot both be closed at the same time.

15. A kit as claimed in claim 12 wherein said electric circuit comprises a first electric line connecting said sensor to a first electric switch forming part of said control means and a second electric line connecting said compressor assembly to a second switch also forming part of said control means, said selector device being designed to selectively activate said first and second switches so that they cannot both be closed at the same time.

16. A kit as claimed in claim 13 wherein said electric circuit comprises a first electric line connecting said sensor to a first electric switch forming part of said control means and a second electric line connecting said compressor assembly to a second switch also forming part of said control means, said selector device being designed to selectively activate said first and second switches so that they cannot both be closed at the same time.

17. A kit as claimed in claim 10 wherein said electric circuit comprises a first electric line connecting said sensor to a first electric switch forming part of said control means and a second electric line connecting said compressor assembly to a second switch also forming part of said control means, said selector device being designed to selectively activate said first and second switches so that they cannot both be closed at the same time.

18. A kit as claimed in claim 10, characterized in that said selector device is movable selectively into a first position in which said compressor assembly cannot be activated; a second position in which said compressor assembly is connected fluidically to said internal connection line; and a third position in which said compressor assembly is connected fluidically to said fluid line, and said electric circuit automatically turns on said compressor assembly (C).

19. A kit as claimed in claim 10 wherein said selector device is movable selectively into a first position in which said compressor assembly cannot be turned on; a second position in which said compressor assembly is connected fluidically to said internal connection line; and a third position in which said compressor assembly is connected fluidically to said fluid line, and said electric circuit automatically turns on said compressor assembly-en and said electric circuit is designed so that said sensor is connected to said compressor assembly when said selector device is in said second position, and is disconnected from said compressor assembly when said selector device is in said third position.

20. A kit as claimed in claim 1 wherein said control means are integrated in said selector device.

21. A kit as claimed in claim 10 wherein said control means are integrated in said selector device.

22. A kit for repairing and inflating an inflatable article, the kit comprising
a chassis,
a compressor assembly for producing compressed air;
a canister assembly containing sealing fluid and connected releasably to said compressor assembly;
an electric circuit for turning on said compressor assembly;
a first line connecting said compressor assembly to said canister assembly;
a second line connected in parallel to said first line to said compressor assembly, and connectable to the inflatable article;
a selector device connected fluidically between said compressor assembly and said first and second line; and user-operated control means to connect said compressor to either said first line or said second line wherein said electric circuit comprises a sensor for determining a connection to said inflatable article said sensor effecting closure of said circuit for activating the compressor, said circuit further containing connectors such that the circuit is only closed when said canister assembly is properly mounted on said chassis whereby current can flow to the compressor only when said sensor determines that a connection has been made to said inflatable article, said control means further acting to close a switch in electrical circuit such that when the compressor is connected to said first line, the compressor assembly is only turned on if said switch is closed wherein said sensor comprises a built-in moveable element that short circuits terminals.

23. A kit as claimed in claim 22, wherein said electric circuit comprises an electrically controlled switch; and a control branch connected to said electrically controlled switch and controlled by said selector device.

24. A kit as claimed in claim 22, wherein said control branch comprises an actuating line for switching said electrically controlled switch; a first electric line; and a second electric line parallel to said first electric line; said selector device being designed to selectively activate said first or said second electric line.

25. A kit as claimed in claim 24, wherein said electric circuit comprises a power branch connected to said compressor assembly and to said electrically controlled switch.

26. A kit as claimed in claim 25, wherein said first electric line comprises a first electric switch, and said line comprises a first second electric line comprises a second switch; said selector device being designed to selectively activate said first and second switch.

27. A kit as claimed in claim 22, wherein said selector device is movable selectively into a first position in which said compressor assembly cannot be turned on; a second position in which said compressor assembly is connected fluidically to said first line; and a third position in which said compressor assembly is connected fluidically to said second line, and said electric circuit automatically activates said compressor assembly.

28. A kit as claimed in claim 22, wherein said selector device is movable selectively into a first position in which said compressor assembly cannot be turned on; a second position in which said compressor assembly is connected fluidically to said first line; and a third position in which said compressor assembly is connected fluidically to said second line, and said electric circuit automatically activates said compressor assembly and said electric circuit is designed so that said sensor is connected to said compressor assembly when said selector device is in said second position, and is disconnected from said compressor assembly when said selector device is in said third position.

29. A kit as claimed in claim 22, wherein said selector device is the only device for user control of said electric circuit.

30. A kit as claimed in claim 22, wherein said electric circuit comprises no manually operated switch separate from said selector device.

31. A kit as claimed in claim 22 wherein said control means are integrated in said selector device.

32. A kit for repairing and inflating an inflatable article, the kit comprising a compressor assembly for producing compressed air;

a canister assembly containing sealing fluid injectable into said inflatable article through a sealing fluid hose by means of a stream of compressed air from said compressor unit;

a fluid line designed to connect said compressor assembly to said inflatable article;

said canister assembly being connected releasably to said compressor assembly;

an electric circuit for turning on said compressor assembly;

an internal connection line connecting said compressor assembly to said canister assembly;

a selector device connected fluidically between said compressor assembly and said fluid line and internal connection line; and user-operated electrical control means to direct fluid from said compressor unit into either said fluid line or said internal connection line and to turn said compressor assembly on and off by means of said electric circuit;

wherein said electric circuit comprises a sensor for determining a connection of said sealing fluid hose to said inflatable article, which sensor effects a short circuit between terminals in said electric circuit wherein said sensor comprises a built-in moveable element that short circuits terminals.

33. A kit as claimed in claim 32 wherein said terminals are designed to short circuit when said sealing fluid hose is affixed correctly to a tyre safety valve.

34. A kit as claimed in claim 32, wherein said electric circuit is designed such that when fluid is to flow through said sealing fluid hose, current flows to the compressor only if said terminals are short circuited.

35. A kit as claimed in claim 32 wherein said electric circuit further comprises an electrically controlled switch which controls the power supply to the compressor, said electrically controlled switch being itself being connected to control means integrated in said selector device.

36. A kit as claimed in claim 32 wherein said electric circuit comprises a first electric line connecting said sensor to a first electric switch forming part of said control means and a second electric line connecting said compressor assembly to a second switch also forming part of said control means, said selector device being designed to selectively activate said first and second switches so that they cannot both be closed at the same time.

37. A kit as claimed in claim 34 wherein said electric circuit comprises a first electric line connecting said sensor to a first electric switch forming part of said control means and a second electric line connecting said compressor assembly to a second switch also forming part of said control means, said selector device being designed to selectively activate said first and second switches so that they cannot both be closed at the same time.

38. A kit as claimed in claim 35 wherein said electric circuit comprises a first electric line connecting said sensor to a first electric switch forming part of said control means and a second electric line connecting said compressor assembly to a second switch also forming part of said control means, said selector device being designed to selectively activate said first and second switches so that they cannot both be closed at the same time.

39. A kit as claimed in claim 32 wherein said electric circuit comprises a first electric line connecting said sensor to a first electric switch forming part of said control means and a second electric line connecting said compressor assembly to a second switch also forming part of said control means, said selector device being designed to selectively activate said first and second switches so that they cannot both be closed at the same time.

40. A kit as claimed in claim 32, wherein said selector device is movable selectively into a first position in which said compressor assembly cannot be-activated; a second position in which said compressor assembly is connected fluidically to said internal connection line; and a third position in which said compressor assembly is connected fluidically to said fluid line, and said electric circuit automatically turns on said compressor assembly (C).

41. A kit as claimed in claim 32 wherein said selector device is movable selectively into a first position in which said compressor assembly cannot be turned on; a second position in which said compressor assembly is connected fluidically to said internal connection line; and a third position in which said compressor assembly is connected fluidically to said fluid line, and said electric circuit automatically turns on said compressor assembly and said electric circuit is designed so that said sensor is connected to said compressor assembly when said selector device is in said second position, and is disconnected from said compressor assembly when said selector device is in said third position.

42. A kit as claimed in claim 32 wherein said control means are integrated in said selector device.

* * * * *